Patented Aug. 31, 1948

2,448,375

UNITED STATES PATENT OFFICE 2,448,375

PREPARATION OF CARBOXYLIC ACIDS

Alfred T. Larson, Wilmington, Del., assignor to E. I. du Pont de Nemours & Company, Wilmington, Del., a corporation of Delaware No Drawing. Application October 31, 1945, Serial No. 625,951

10 Claims. (Cl. 260—533)

This invention relates to the synthesis of organic compounds and particularly to the preparation of aliphatic carboxylic acids by the interaction of olefines, carbon monoxide, and steam.

Aliphatic acids of the higher order such as propionic acid, butyric acid, etc., have been heretofore prepared by various methods. For example, propionic acid has been obtained by the reduction of acrylic or lactic acid; by suitable Schizomycetes fermentation of the lactate or malate of calcium; or by the oxidation of propyl alcohol with dichromate solution. Such methods of preparation are necessarily expensive due principally to the relatively high cost of the raw materials. Owing to the many important uses to which acids of this type are adaptable, many of which uses have not been exploited extensively due to their present high cost, it is obvious that a process for their preparation from raw materials, which are, at present, readily available and which will be even more readily available in the near future, will be of far reaching importance in this art.

In the Larson and Vail patent, U. S. 1,924,765, a process is described for the preparation of aliphatic carboxylic acids of the higher order by the reaction of steam, carbon monoxide, and an olefinic hydrocarbon, i. e. an aliphatic hydrocarbon containing a double bond, for example, the olefines ethylene, propylene, butylene, etc., in the presence of ammonium chloride and activated charcoal. The acid produced contains one more carbon atom than the unsaturated hydrocarbon treated.

The Carpenter patent, U. S. 1,924,768, discloses other catalysts which may be employed in the reaction such as phosphoric acid or calcium halide supported on activated charcoal. In the Carpenter patent, it is stated that the presence of metallic carbonyls in the reaction mixture is to be avoided. It is therefore surprising to discover, as herein disclosed, that certain specific metallic carbonyls have a highly beneficial effect upon the reaction. The deleterious action of iron carbonyl on the synthesis has been confirmed, but it has been discovered in accordance with the present invention that certain other carbonyls, especially in the absence of iron carbonyl, not only fail to exhibit any harmful effect, but are, in fact, outstandingly excellent catalysts for the reaction.

An object of the present invention is to provide an improved process for the preparation of aliphatic carboxylic acids from steam, carbon monoxide, and olefinic hydrocarbons. A further object of this invention is to provide a process for the preparation of monocarboxylic acids from steam, carbon monoxide and an olefine in the presence of a relatively non-corrosive catalyst. Another object of the invention is to provide a process for the preparation of acids having a structural formula

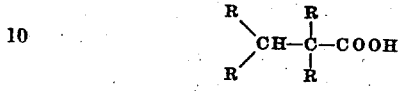

from steam, carbon monoxide, and an olefinic hydrocarbon, the R indicating hydrogen or a substituted or unsaturated similar or dissimilar alkyl or aralkyl grouping. Other objects and advantages will appear hereinafter.

It has been found in accordance with the invention that aliphatic carboxylic acids can be prepared from steam, carbon monoxide and an olefinic hydrocarbon, by passing these constituents in the presence of nickel carbonyl or cobalt carbonyl, under suitable pressure and temperature conditions, over active carbon, and more particularly over activated charcoal. The product resulting from such a reaction, will contain, generally, aliphatic carboxylic acids, and, more specifically, aliphatic carboxylic acids having one more carbon atom per molecule than the olefine treated.

Raw materials suitable for use in the process are readily available from a number of sources. Thus, ethylene and various homologues thereof are found in the gases evolved in cracking petroleum and may be separated therefrom, by fractional liquefaction. It is preferable, for the sake of avoiding undesirable by-products, that the hydrocarbon which it is desired to convert be employed in a relatively high degree of purity.

The carbon monoxide required for the synthesis may conveniently be derived from various commercial sources, such as, for example, water-gas, producer gas, etc., by liquefaction or other methods, and should likewise for the best results be relatively pure.

Inert gases, such as nitrogen, may be included with the reactants, this being advantageous in some cases from the standpoint of controlling the temperature of the exothermic reaction and of limiting the extent thereof, where it may be desired to restrict the overall conversion of the reactants for the sake of enhancing the relative yield of the desired acids.

It is also frequently desirable, especially when a cobalt carbonyl catalyst is employed, to introduce carbon dioxide along with the reactants in order to suppress the water gas reaction, since the presence of excessive amounts of hydrogen in the reaction mixture generally gives rise to a mixture of reaction products rather than to high yields of the desired carboxylic acids.

The relative proportions of the reactants can be varied although it has been found that very advantageous results are obtained when the steam and carbon monoxide are in excess with respect to the olefinic hydrocarbon. Concentrations of the latter within the range of from 1½ to 10% by volume of the total reactants have been employed with good results.

The use of pressures in excess of atmospheric, say from 500 to 1500 atmospheres, is preferred. These high pressures not only give rise to a rapid reaction rate, but they also act to direct the reaction and suppress the thermal decomposition of the nickel carbonyl or cobalt carbonyl. The reaction proceeds over a wide range of temperatures although the optimum temperature varies with specific cases, depending inter alia upon the hydrocarbon being used. Generally the desired reaction can be obtained at from 200° to 400° C. From the standpoint of practical operation the temperature should not be so low that the reaction rate is uneconomical nor so high as to result in undesirable by-products by decomposition and/or polymerization of raw materials. From this point of view the process has been found to operate satisfactorily at from 275° to 375° C.

The following examples will illustrate the invention, although it is to be understood that the invention is not limited to the particular method illustrated therein.

*Example 1.*—A gaseous mixture is prepared containing by volume 95% carbon monoxide, and 5% ethylene. These gases are then mixed with sufficient steam to give a steam, carbon monoxide and ethylene ratio of approximately 0.25. The resulting gaseous mixture is passed into a conversion chamber designed for carrying out exothermic gaseous reactions, said chamber being partially filled with activated charcoal, and simultaneously nickel carbonyl is injected into the chamber at a rate sufficient to give a mixture containing about 1% by weight of nickel carbonyl. The temperature of the reaction is maintained at approximately 325° C. while the pressure is held at approximately 700 atmospheres. A good yield of propionic acid is obtained together with other aliphatic acids.

*Example 2.*—Example 1 is repeated using a similar mixture of reactants (72% by volume carbon monoxide, 3% ethylene and 25% steam), and the same conditions of temperature and pressure. Cobalt carbonyl corresponding to about 0.5% by weight of this reaction mixture is injected into the converter along with the other gases. This mixture is passed over activated charcoal and a reaction mixture containing propionic acid together with minor amounts of diethyl ketone is produced.

It is to be understood that, while the preferred absorptive material for use in the present invention is activated charcoal, other absorptive materials may be employed with the said nickel or cobalt carbonyls, although, generally, the results obtained with absorptive solids other than activated charcoal are found to be inferior. If desired, the catalyst may be admixed with the absorptive materials to produce a supported catalyst, prior to injection of the reactants. A suitable contact material is, for example, activated charcoal containing about 20% by weight of nickel carbonyl. Examples of absorptive solids, other than charcoal, which may be employed in the practice of the invention are silica gel, fuller's earth, kieselguhr, alumina, etc. In general, it is preferred to employ these catalysts in the absence of free inorganic acidic materials, which tend to destroy the carbonyls. If desired, the carbonyls may be injected into the reaction chamber in the form of a solution in an inert solvent.

The apparatus which may be employed for conducting this reaction may be of any conventional type and preferably one in which the temperature of the exothermic reaction can be readily controlled at the desired value. One of the chief advantages of the present invention is that it permits the use of reaction vessels and conduits which would be rapidly corroded by catalysts which heretofore have been employed for the reaction. The reaction vessels employed in the practice of the invention may, therefore, be constructed of any metal which withstands attack by aliphatic acids at elevated temperatures. This includes certain varieties of steel, as well as other acid-resistant metals including copper, silver, silver alloys, etc.

Various changes may be made in the method herein described without departing from the invention or sacrificing the advantages thereof.

I claim:

1. A process for the preparation of aliphatic carboxylic acids from steam, carbon monoxide and an olefinic hydrocarbon which includes the step of effecting reaction at a pressure of from 500 to 1500 atmospheres in the presence of a catalyst formed prior to the said reaction, said catalyst being a member of the class consisting of nickel carbonyl and cobalt carbonyl, in the presence of active carbon, and in the absence of any other catalyst for the said reaction.

2. A process for the preparation of aliphatic carboxylic acids from a gaseous mixture containing steam, carbon monoxide and an olefinic hydrocarbon which comprises passing the gaseous mixture at a pressure of from 500 to 1500 atmospheres, together with a catalyst formed prior to the said reaction, said catalyst being a member of the class consisting of nickel carbonyl and cobalt carbonyl over active carbon, and in the absence of any other catalyst for the reaction between steam, carbon monoxide and an olefinic hydrocarbon.

3. A process for the preparation of aliphatic carboxylic acids from a gaseous mixture containing steam, carbon monoxide and an olefinic hydrocarbon which comprises passing the gaseous mixture at a pressure of from 500 to 1500 atmospheres together with a catalyst formed prior to the said reaction, said catalyst being a member of the class consisting of nickel carbonyl and cobalt carbonyl over activated charcoal and in the absence of any other catalyst for the reaction between steam, carbon monoxide and an olefinic hydrocarbon.

4. A process for the preparation of aliphatic carboxylic acids from steam, carbon monoxide and an olefinic hydrocarbon which includes the step of effecting the reaction at a pressure of from 500 to 1500 atmospheres in the presence of a catalyst formed prior to the said reaction, said catalyst being a member of the class consisting of nickel carbonyl and cobalt carbonyl, supported on activated charcoal and in the absence of any other catalyst for the reaction between steam, carbon monoxide and an olefinic hydrocarbon.

5. A process for the preparation of aliphatic carboxylic acids from a gaseous mixture containing steam, carbon monoxide, and an olefinic hydrocarbon which comprises passing the gaseous mixture at a pressure of from 500 to 1500 atmospheres together with preformed nickel carbonyl over activated charcoal and in the absence of any other catalyst for the reaction between steam, carbon monoxide and an olefinic hydrocarbon.

6. A process for the preparation of propionic acid from a gaseous mixture containing steam, carbon monoxide and ethylene which comprises passing the gaseous mixture at a pressure of from 500 to 1500 atmospheres together with preformed nickel carbonyl over activated charcoal, and in the absence of any other catalyst for the reaction between steam, carbon monoxide and ethylene.

7. A process for the preparation of propionic acid from a gaseous mixture containing steam, carbon monoxide and ethylene which comprises passing the gaseous mixture at a pressure of from 500 to 1500 atmospheres together with preformed cobalt carbonyl over activated charcoal, and in the absence of any other catalyst for the reaction between steam, carbon monoxide and ethylene.

8. A process for the preparation of propionic acid from a gaseous mixture containing steam, carbon monoxide and ethylene which comprises passing the gaseous mixture at a pressure of from 500 to 1500 atmospheres over activated charcoal containing about 20% by weight of preformed nickel carbonyl, and in the absence of any other catalyst for the reaction between steam, carbon monoxide and ethylene.

9. A process for the preparation of aliphatic carboxylic acids at a temperature of approximately 325° C. and a pressure of approximately 700 atmospheres by the interaction of a gaseous mixture comprising approximately 72% carbon monoxide and 3% of an olefinic hydrocarbon, and 25% steam, the step which comprises effecting the reaction in the presence of activated charcoal, and, as the sole catalyst a member of the class consisting of nickel carbonyl and cobalt carbonyl, said catalyst being formed prior to the said interaction.

10. A process for the preparation of propionic acid at a temperature of approximately 325° C. and a pressure of approximately 700 atmospheres by the interaction of a gaseous mixture containing approximately 72% carbon monoxide, 3% ethylene, and 25% steam, the step which comprises effecting the reaction in the presence of a catalyst consisting of nickel carbonyl and activated charcoal, said catalyst being formed prior to the said interaction.

ALFRED T. LARSON.

REFERENCES CITED

The following references are of record in the file of this patent:

UNITED STATES PATENTS

| Number | Name | Date |
|---|---|---|
| 1,924,763 | Carpenter | Aug. 29, 1933 |
| 1,957,939 | Carpenter | May 8, 1934 |
| 2,000,053 | Vail | May 7, 1935 |
| 2,079,216 | Larson | May 4, 1937 |
| 2,135,459 | Loder | Nov. 1, 1938 |

FOREIGN PATENTS

| Number | Country | Date |
|---|---|---|
| 335,551 | Great Britain | Sept. 23, 1930 |

OTHER REFERENCES

Hieber et al.: Chemical Abstracts, vol. 37, col. 3684 (1943).